April 28, 1970     W. J. ROANTREE     3,508,452

GEARING MECHANISM

Filed April 11, 1968     2 Sheets-Sheet 1

INVENTOR.
WILLIAM J. ROANTREE
BY
Albert M. Parker
ATTORNEY.

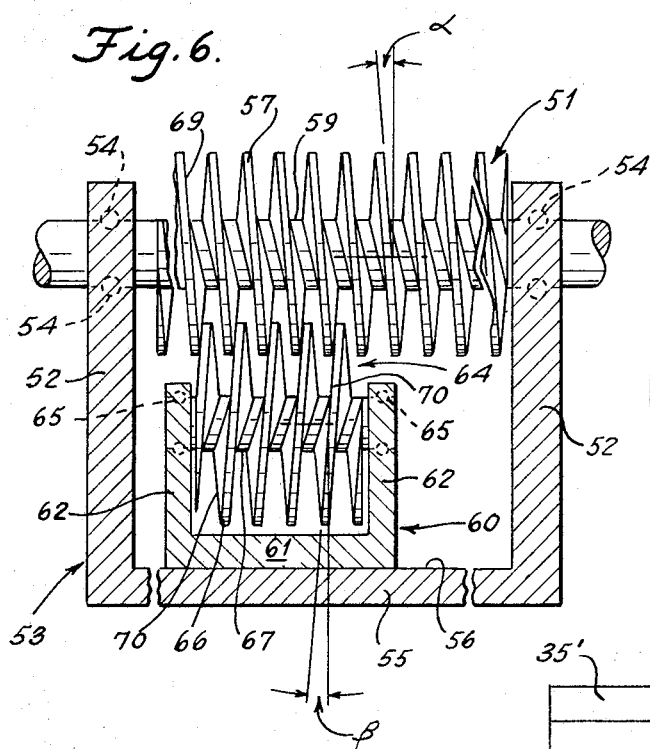
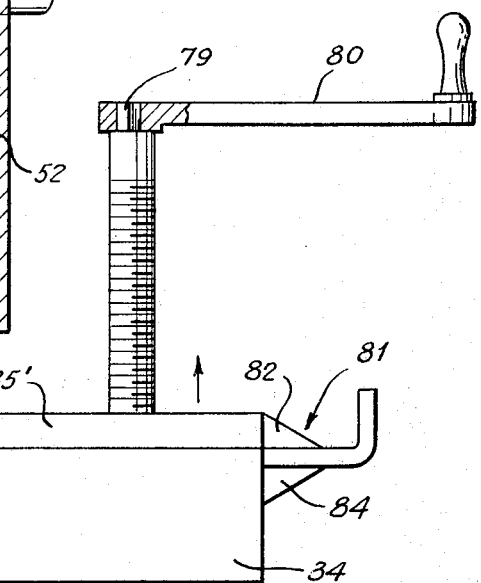
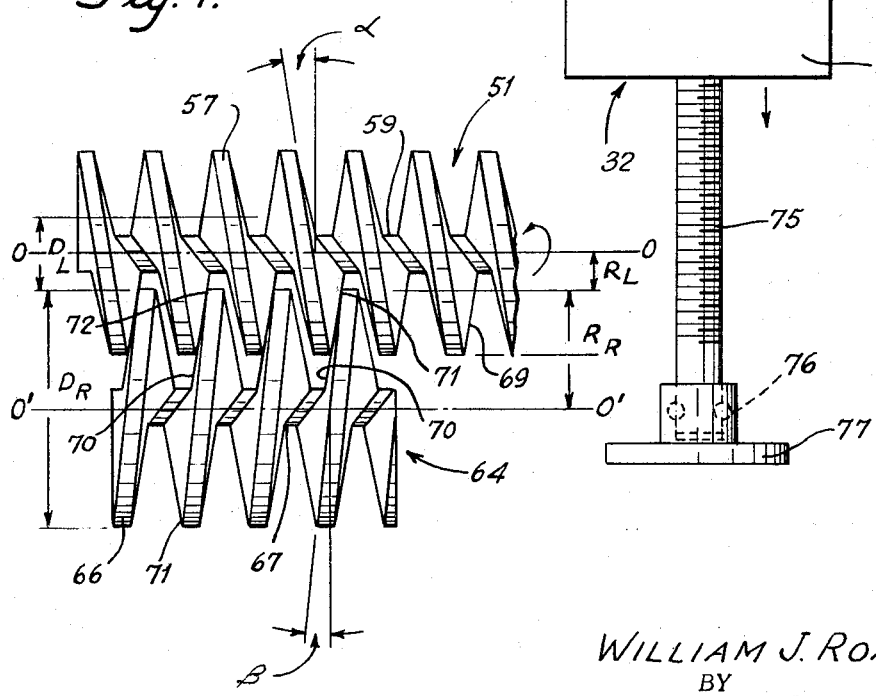

United States Patent Office 3,508,452
Patented Apr. 28, 1970

3,508,452
GEARING MECHANISM
William J. Roantree, Port Washington, N.Y., assignor to Roantree Electro-Mech Corporation, Port Washington, N.Y.
Continuation-in-part of application Ser. No. 614,339, Feb. 6, 1967. This application Apr. 11, 1968, Ser. No. 729,860
Int. Cl. F16h 1/08, 29/20
U.S. Cl. 74—424.7                                    13 Claims

ABSTRACT OF THE DISCLOSURE

A gearing mechanism for converting rotary to linear motion. The mechanism includes a lead screw having a thread of a constant pitch, the thread being in driving relationship with one or more differential rollers having a thread of generally the same pitch, the roller or rollers being mounted upon a carriage mounted for linear travel along the lead screw.

CROSS-REFERENCE TO RELATED APPLICATION

This application is a continuation-in-part of application Ser. No. 614,339, filed Feb. 6, 1967, now abandoned.

BACKGROUND OF THE INVENTION

Field of the invention

This invention relates to a gearing mechanism which converts rotary motion to linear motion. The mechanism includes a lead screw and one or more differential rollers having screw threads of generally the same pitch as those on the lead screw and drivingly connected to such threads. As the lead screw rotates, the differential roller is rotated thereby, the resultant speed of the carriage upon which the roller is mounted being a function of the ratio of the effective diameters of the lead screw and roller at their zones of driving engagement.

Description of the prior art

Slow speed conversion of rotary motion to linear motion has been secured by the use of a lead screw having two thread portions of the same hand but somewhat different pitch threadedly engaged with respective nuts. Rotation of the lead screw causes the nuts to separate or approach each other, depending upon the direction of rotation of the screw, at rates which are functions of the differences between the pitches of the respective thread portions. Such mechanism may be employed to give large mechanical advantages in reciprocating mechanisms such as platen presses, lifting devices, jacks, and the like. The gearing mechanism in accordance with the invention is of simpler and more rugged construction than is possible with prior art mechanisms, including that above described.

SUMMARY OF THE INVENTION

The gearing mechanism in accordance with the invention provides a simple means for converting rotary motion to linear motion, the ratio between the rotary motion and the linear motion being substantially synchronized.

In the various embodiments of gearing mechanism disclosed herein, the threads on the lead screw and the differential roller or rollers are of the same pitch and opposite hand, the threads on the lead screw and the differential roller being in meshing direct driving engagement. It is to be understood that when the axes of the lead screw and differential roller are skewed somewhat relative to each, their pitches are somewhat different, that is, they are only generally the same. In certain disclosed embodiments the radially outer surfaces of the lands on one of the members drivingly engage the roots of the grooves of the screw thread on the other of said members. In other disclosed embodiments radially outer edges of the lands on one of said members drivingly engage corresponding sides or flanks of the lands on the other of said members.

BRIEF DESCRIPTION OF THE DRAWING

FIG. 6 is a fragmentary somewhat schematic view partially in vertical axial section and partially in side elevation of a fourth embodiment of gearing mechanism in accordance with the invention;

FIG. 7 is an enlarged view in side elevation of a fragment of the gearing mechanism of FIG. 6; and FIG. 8 is a view in side elevation of a lifting device or jack incorporating the gearing mechanism of FIGS. 3 and 4.

DESCRIPTION OF THE PREFERRED EMBODIMENTS

Figure 1:
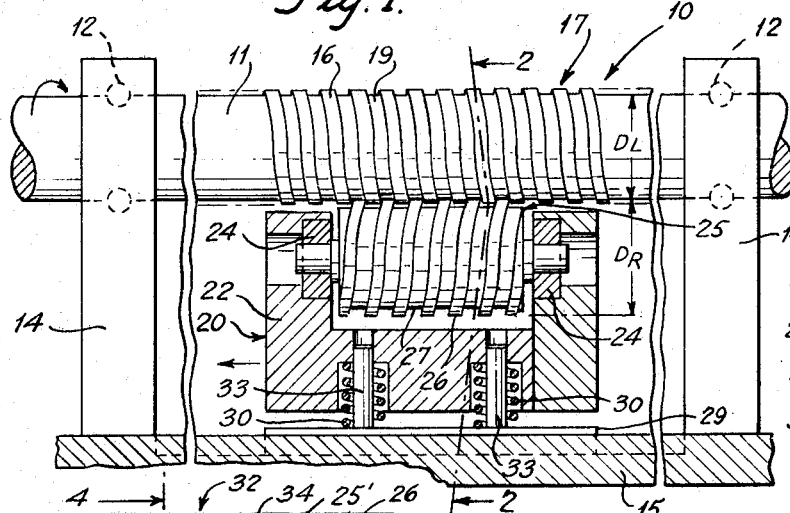
FIG. 1 is a somewhat schematic fragmentary view partially in vertical axial section and partially in side elevation of a first embodiment of gearing mechanism in accordance with the invention.
Figure 2:
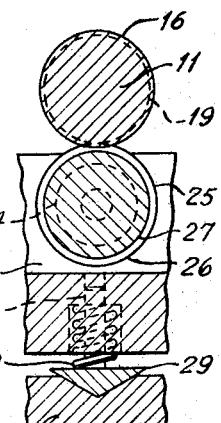
FIG. 2 is a fragmentary view in section of the mechanism of FIG. 1, the section being taken generally along the broken section line 2—2 of FIG. 1 looking in the direction of the arrows.

As evident from the above, there are shown and described herein four embodiments of gearing mechanism in accordance with the invention. Such embodiments are as follows:

(1) FIGS. 1 and 2;
(2) FIGS. 3 and 4;
(3) FIG. 5; and
(4) FIGS. 6 and 7.

In all of embodiments (1) to (4), the ratio between the speed of rotation of the lead screw and the linear travel of the carriage bearing the differential roller or rollers is constant or fixed. In embodiments (1), (2), and (4), the driving engagement between the lead screw and the differential roller or rollers is frictional. In embodiment (3) the differential rollers are positively geared to the lead screw to rotate in synchronism therewith. In all of the disclosed mechanisms the ratio $D_L/D_R$ determines the rate of travel or effective lead (L) of the differential roller or rollers along the lead screw in accordance with the equation:

$$L = L_L + \frac{D_L}{D_R} \cdot L_R$$

where:

$L_L$ = the lead of the lead screw;
$L_R$ = the lead of the differential roller;
$D_L$ = diameter of the driving surface of the lead screw; and
$D_R$ = diameter of the driving surface of the differential roller.

$L_L$ and $L_R$ are positive if their screw threads are right handed, and are negative if their screw threads are left handed.

L is positive when the direction of relative travel of the lead screw and differential roller is in the right-hand sense, and is negative when the direction of such relative travel is in the left-hand sense.

$D_L$ and $D_R$ are positive if the screw thread of the respective part is a male thread, and are negative if the screw thread of the respective part is a female thread.

Turning now to the drawings, the gearing mechanism of FIGS. 1 and 2 is designated generally by the reference character 10. In such mechanism there is a longitudinally extending lead screw 11 which has an unthreaded stub shaft or trunnion portions thereon beyond the ends of the screw thread 16. Such trunnions are mounted in bearings 12 in spaced upstanding supports 14 which extend in spaced parallel relationship from a base 15. The base 15 and the supporting portions 15 are in turn mounted upon a fixed structure such as a frame (not shown). The lead screw 11 is rotated by driving means (not shown) connected to a portion of one of the trunnions extending beyond its support 14.

In the embodiment shown, a single differential roller 25 is mounted below the lead screw 11 with the axis of the roller parallel to that of the lead screw. The differential roller, which is threaded in its main intermediate extent, has stub shafts or trunnions on opposite ends thereof, such trunnions being mounted in bearings 24 in respective upstanding parallel supports 22. Supports 22 are connected to a base 20, the supports 22 and the base 20 constituting a carriage which is mounted for movement with the roller 25 axially of the lead screw 11 in a manner to be described. The differential roller 25 has threads thereon of the same pitch as but opposite hand from the threads on the lead screw 11. In the embodiment of FIGS. 1 and 2, the driving engagement between the thread 17 on the lead screw 11 and the thread on the differential roller 25 is between the roots 19 of the thread on the lead screw and the peripheral outer surfaces of the lands 26 on the differential roller 25. The radial depth of the lands 26 somewhat exceeds that of the lands 16 of the threads 17 so that there is appreciable clearance between the roots of the grooves on the differential roller and the peripheral surfaces of the lands 16 when the parts are in driving engagement, as shown in FIGS. 1 and 2.

In order to maintain forcible, substantially non-slipping driving engagement between the lands of the differential roller and the roots of the grooves on the lead screw, the differential roller is constantly urged toward and into engagement with the lead screw. In the embodiment shown, the means for so doing is in the form of a member 29 which in vertical section (FIG. 2) is of broad V shape. Member 29 accurately fits within and slides longitudinally of a V-shaped groove in the base 15 of the frame, such groove being of complementary shape as regards the surface of member 29 and disposed centrally below the axis of the lead screw 11. Member 29, which has an axial length substantially the same as that of the carriage 20, moves therewith as the differential roller 25 and its carriage 20 travel longitudinally of the lead screw. Thus a plurality of vertical guide pins 33 project centrally upwardly from the member 29, such guide pins being accurately received within vertical bores in the base member 22 of the carriage 20. The carriage and the differential roller supported thereby are forcibly thrust forwardly, as the mechanism is shown, by a plurality of coil compression springs 30 which are telescoped over the respective pin members 33 and act between the upper ends of counterbores in the base 22 of the carriage and the upper surface of the member 29.

As above explained, driving engagement between the lead screw 11 and the differential roller 25 in the embodiment of FIGS. 1 and 2 takes place between the root 19 of the helical groove in the lead screw and the peripheral surface of the lands 26 on the differential roller. In FIG. 1 the diameter of the groove 19 is designated $D_L$, and the diameter of the lands 26 is designated $D_R$.

Figure 3:
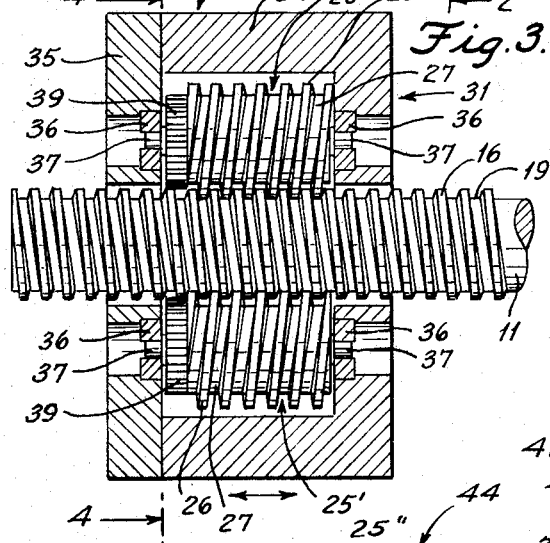
FIG. 3 is a fragmentary somewhat schematic view partially in vertical axial section and partially in side elevation of a second embodiment of gearing mechanism in accordance with the invention.
Figure 4:
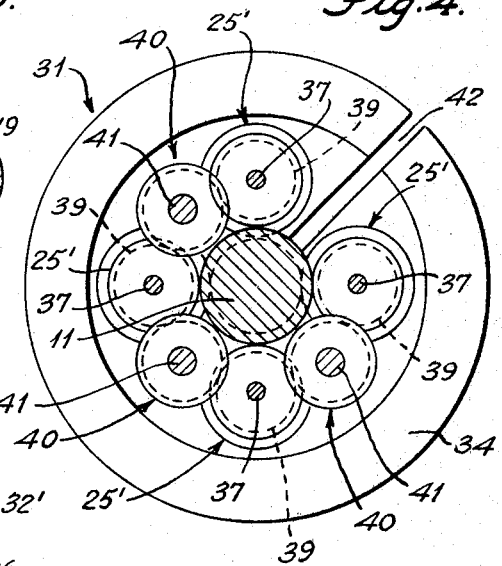
FIG. 4 is a view in transverse section through the mechanism of FIG. 3, the section being taken along the line 4—4 of FIG. 3 looking in the direction of the arrows.

In the second embodiment of gearing mechanism, shown in FIGS. 3 and 4, there are employed a plurality (four shown) of similar differential rollers 25' which are spaced at equal angles about the axis of the lead screw. The differential rollers 25' are mounted in a housing or carriage 32 having a main cup-shaped part 34 and a cover plate or disc 35 secured thereto. The body 34 and the disc 35 of the housing are radially split at a cut 42 therethrough. The parts 34 and 35 of the housing are made of spring material such as spring steel, so that the housing constantly resiliently thrusts the differential rollers 25' into driving engagement with the lead screw. Each end of the differential rollers is provided with a central stub shaft 37, the stub shafts being journalled in suitable bearings 36 which are mounted, respectively, in the transverse end wall of the body 34 and the cover disc 35 of the housing.

As in the embodiment of FIGS. 1 and 2, the peripheral surfaces of the lands 26 of the screw thread on the respective differential rollers frictionally engage the roots 19 between successive turns of the land 16 on the lead screw 11. Appreciable clearance is provided between the peripheral surfaces of the lands 16 and the roots 27 of the threads on the differential rollers.

The threads on the differential rollers 25' are of the same pitch as but of opposite hand from the thread on the lead screw 11. Because of their angular displacement about the axis of the lead screw 11, the differential rollers are displaced angularly from each other about their respective axes. In order to maintain the differential rollers 25' synchronized in such phased-displaced relationship, the rollers are geared together by a gear train including gears 39, one of which is affixed to each differential roller at the same, left end (FIG. 3) thereof, and gears 40, one of which is interposed between and meshing with each pair of gears 39. The gears 40 are here shown as being disposed adjacent the cover disc 35 of the housing; gears 40 are provided with central shafts 41 which are journalled, by means not shown, at one end in the cover disc 35 and at their other end in the transverse wall portion of the main body 34 of the housing.

Figure 5:
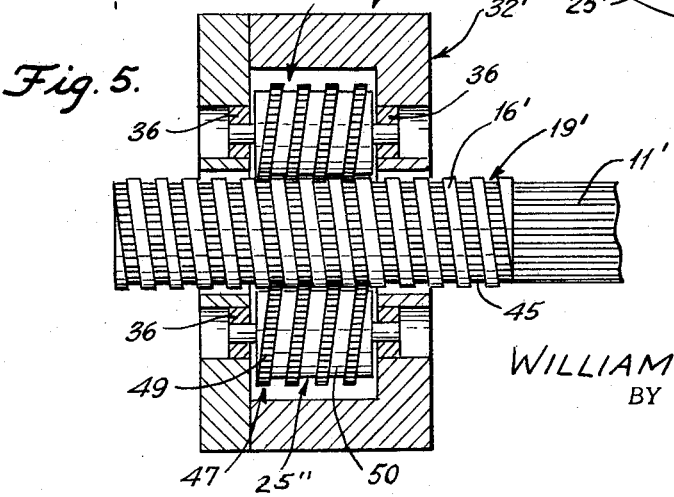
FIG. 5 is a fragmentary somewhat schematic view partially in axial vertical section and partially in side elevation of a third embodiment of gearing mechanism in accordance with the invention.

The gearing mechanism of FIG. 5, which is generally designated 44, has parts which generally resemble those of FIGS. 3 and 4. Accordingly, those parts in FIG. 5 which are similar to those of the previous embodiment are designated by the same reference characters with an added prime. In general, the embodiment of FIG. 5 differs from that of FIGS. 3 and 4 by positively gearing the differential rollers to the lead screw for synchronized rotary movement with respect to each other, the gearing mechanism employed for such purpose also maintaining the differential rollers in a synchronized fixed relationship with respect to the lead screw.

In the embodiment of FIG. 5 two differential rollers 25″ are shown, such rollers being displaced at 180° relative to each other. It will be understood, however, that in this embodiment four such rollers are actually employed, spaced 90° from each other around the axis of the lead screw. Such rollers are journalled, as in FIGS. 3 and 4, in bearings 36' which are mounted upon the cover disc and the end of the body 32' of the housing. The lead screw 17' on the shaft 11' is formed by first shaping the shaft so that it is of elongated spur gear shape, following which a wire or bar of small section is wound upon the shaft to form helical lands 16' of a constant helix angle or pitch, the lands 16' being separated by a helical groove. Such wire or bar, after having been thus positioned upon the shaft, is secured thereto as by brazing or welding operations. In the thus formed lead screw, the helical groove between lands 16' is provided with longitudinally extending gear teeth 45, as shown.

The differential rollers 25″ may be formed in the usual manner as by screw cutting operations, following which gear teeth 49 are cut upon the peripheral surfaces of the lands 47 on the rollers. The roots of the helical groove 50 between successive turns of the land 47 are smooth, as before. The parts are made of such dimensions that substantial clearance is provided between the peripheral surfaces of the land 16' on the lead screw and the roots of the groove 50 on the differential rollers.

In the previously described embodiments of the apparatus, the meshing threads on the lead screw and the differential roller or rollers are of square or modified Acme type, driving engagement therebetween being effected between the peripheral surfaces of the lands of one of such parts and the root surfaces of the groove on the other of the parts. As is apparent in the embodiment of FIGS. 6 and 7, now to be described, the threads of the lead screw and differential roller may be varied considerably in shape, and the engagement between the threads may be a flank-to-flank engagement rather than a land-to-root engagement. It will be apparent that in the embodiment of FIG. 5 the speeds of rotation of the lead screw 11' and the differential rollers 25" are positively synchronized, and are determined by the pitch diameters of the meshing gear teeth 45 on the root of the helical groove on the lead screw and the teeth 49 on the helical lands of the differential rollers.

In FIGS. 6 and 7 there is shown a lead screw having a threaded portion 51, the screw being journalled between spaced parallel upstanding supports 52 which are connected by a base portion 55 to form a housing 53, the shaft being shown as journalled in bearings 54 in such supports. A single differential roller 64 is shown mounted parallel to the lead screw and journalled at its ends in bearings 65 in spaced parallel supports 62 which are connected by a base 61. Parts 61 and 62 form a carriage 60 which is movable lengthwise of the support 52 parallel to the axis of the lead screw 51. Means not shown, such as the parallel side walls of the housing 53, are provided to maintain the carriage 60 and the roller 64 parallel to the lead screw as they move therealong.

The screw thread 51 of the lead screw and the screw thread 64 of the differential roller are of substantially similar configuration, both being of modified Acme shape with radially deep lands. The thread 51 has helical lands 57 which are spaced by an interposed helical groove having a root 59. The thread of the differential roller 64 has deep helical lands 66 which are spaced by a helical groove having a root 67. The differential roller is so located relative to the lead screw that the screw threads on such parts intermesh, as shown.

It is assumed in the construction shown in FIG. 6 that the carriage 60 is subjected to an endwise thrust acting in a direction from right to left. Accordingly, the carriage is thrust to the left so that the left-hand peripheral edge 71 of the flanks 70 of the lands 66 on the differential roller engage the right-hand flanks 69 of the lands 57 at points which are designated 72 (FIG. 7). The configurations of the lands of the two threads are such that, with the spacing shown between the longitudial axes of the lead screw and the differential roller, there is appreciable clearance between the lands except for the described engagement of the points 71 on the edge of the lands of the differential roller with the flank 69 of the land of the lead screw. In order to provide such clearance, the flanks 69 of the lands 57 on the lead screw 51 are disposed at an angle α with respect to a transverse plane normal to the axis of the lead screw, and the flanks 70 of the lands 66 on the differential roller 64 are disposed at an angle β with respect to a transverse plane normal to the axis of the differential roller, the angle α being somewhat greater than the angle β.

In FIG. 7 the common point 71, 72 of driving engagement between the lead screw and the differential roller is shown as lying at a distance $D_L/2 = R_L$ from the axis O—O of the lead screw and at a distance $D_R/2 = R_R$ from the axis O'—O' of the differential roller. It will be apparent from the above equation that the speed of longitudinal travel of the carriage 60 with a given speed of rotation of the lead screw is a function of the ratio $R_L/R_R$.

In FIG. 8 there is shown a lifting device such as an automobile jack which incorporates the gearing mechanism of FIGS. 3 and 4. As there shown, a lead screw designated 75 and disposed in upright position is journalled at its lower end in a bearing 76 mounted in a ground-engaging base member 77. The screw 75 is rotated about its axis by a crank 80 which is demountably secured to a squared or otherwise keyed end portion 79 on the screw. The lifting mechanism has a housing 32 with a main body 34, the body being of cup-like shape and enclosing the differential roller mechanism and the roller synchronizing means therefor which are shown in FIGS. 3 and 4. The carriage 32 is completed by a closure member 35' which is generally similar to the member 35 in FIG. 3. A hook-like member 81 which functions as a bumper engaging lifting means of the jack, is secured to the housing by bracing members 82 and 84 which are attached to the body and the cover portions, respectively, of the housing.

The friction in the sleeve type bearings mounting the differential rollers of the gearing mechanism is sufficient to prevent the weight of the lifted automobile from turning the lead screw 75 in the direction opposite from its lifting direction when the crank 80 is released. Additionally, a sleeve bearing may be substituted for the ball bearing 76, with the lower end of screw 75 abutting the bottom of the socket in the ground engaging member 77. Means, not shown, such as a pin which may be inserted through holes in the sidewalls of the socket and an aligned hole in the lower end of screw 75, may be used to lock the screw 75 positively to member 77, thereby to prevent the unwanted turning of the screw after the automobile or other load has been jacked to the desired height.

Although in the embodiments shown the axes of the differential rollers lie parallel to the axis of the lead screw, it will be apparent that, if desired, the axes of the differential rollers may be skewed somewhat relative to the axis of the lead screw, providing the configuration of the lands and grooves on the respective members is such that they freely mesh with each other and run free of contact except for the zone of driving engagement therebetween. It is also to be understood that when the angle between the driving surfaces of the lead screw and of the differential roller or rollers is less than the angle of repose between such parts, the differential rollers can not move axially of the lead screw unless the lead screw is rotated. This does not mean that the lead screw must be externally driven in order to reverse the motion. When the lead screw and the rollers are sufficiently free to rotate, an axial force applied to the carriage mounting the rollers creates moments about each axis that will cause both the screw and the rollers to rotate. This rotation of elements will allow linear motion of the roller relative to the lead screw.

For the above type of reversible action to occur, the unit must ordinarily use antifriction bearing on the axis of each element since the moments causing rotation are relatively small. The speed ratio of linear motion to rotary motion will be identical to that expressed by the expression for effective lead given above. The driving engagement between the lead screw and the differential roller or rollers in all of the disclosed embodiments is essentially rolling in character, whether the drive be frictional as in the first, second, and fourth embodiments or positive as in the third embodiment. Consequently, the operation of the mechanism of the invention entails only small frictional losses.

It will be apparent that although the screw threads on the lead screw and on the differential roller or rollers in all of the illustrated embodiments are of the single thread type, the threads on either or both such members may be of the multiple thread type. It will also be apparent that either the lead screw or the differential roller may have a female screw thread, the thread of the other member then being male.

The gearing mechanism described in the foregoing specification performs the function of converting rotary motion to linear motion. In accordance with the broader aspects of the invention, however, it should be understood that this gearing mechanism can also be used to convert linear motion to rotary motion. In other words, the implied direction of drive of the mechanism may be reversed so that axial forces may be converted to rotational torques. In reversing the direction of drive, special design requirements are introduced, since the high mechanical advantage normally associated with the mechanism results in high rotational speed relative to the linear speed.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. A differential gearing mechanism for drivingly connecting a first rotatable element and a second element movable in a linear path comprising two members of which one is a lead screw connected to the first element and the other of which is a differential roller connected to the second element, the lead screw and the differential roller having screw threads of substantially the same pitch thereon, the two members being disposed with parts thereof in side-by-side relationship, means mounting the lead screw and the differential roller for rotation about their respective axes, said last named means being so constructed and arranged as to permit relative movement of said parts of the differential roller and the lead screw in a direction generally along the axis of the lead screw, each of said screw threads having alternating helical lands and grooves, and serially connected means including driving portions of the screw threads for drivingly connecting the two members for joint rotation, whereby upon rotation of one of said members the said parts of the two members travel generally axially with respect to each other at a speed which is substantially a function of the instantaneous difference in the effective diameters of the portions of the screw threads on said two members which are in driving relationship with each other.

2. A mechanism as claimed in claim 1, wherein the two members are disposed with said parts thereof in generally parallel relationship.

3. A mechanism as claimed in claim 1, wherein the threads on the two members are of opposite hand, and the two screw threads are drivingly engaged in meshing relationship with the lands on one member disposed within the grooves on the other member.

4. A mechanism as claimed in claim 3, wherein the radially outer surfaces of the lands of the thread on one of said members drivingly engage the surfaces at the roots of the thread on the other member, said engaging surfaces of the lands and roots having somewhat different effective diameters.

5. A mechanism as claimed in claim 4, wherein the said outer surfaces of the lands of the thread on said one member and the surfaces at the roots of the thread on the other member are smooth and frictionally drivingly engage each other, and comprising means for thrusting said members toward each other and said surfaces into tight engagement with each other.

6. A mechanism as claimed in claim 4, wherein the said outer surfaces of the lands of the thread on said one member and the surfaces at the roots of the thread on the other member are provided with gear teeth disposed in helical rows thereabout, and the said gear teeth on the two members are in meshing driving engagement.

7. A mechanism as claimed in claim 4, comprising a second differential roller similar to the first recited differential roller, said first recited and second differential rollers being disposed similarly with respect to the lead screw, but angularly spaced from each other about the axis of the lead screw, and means positively synchronizing both differential rollers in their rotation about their respective axes.

8. A mechanism as claimed in claim 3, wherein corresponding radially outer edges of the lands of the thread on one member drivingly engage the corresponding sides of the lands on the other member at locations spaced radially outwardly from the roots of the grooves of the thread on said other member.

9. A mechanism as claimed in claim 8, wherein the lands on at least one of the members are generally of radially outwardly converging V-shape in axial section, and the spaces between the lands of said one member are of greater axial width throughout a substantial portion of their radial depth than the width of the tips of the lands on the other member.

10. A mechanism as claimed in claim 1, wherein the effective diameter of the driving portion of the screw thread on the differential roller is constant throughout its length.

11. A mechanism as claimed in claim 10, wherein the effective diameter of the driving portion of the screw thread on a zone of substantial axial length of the lead screw is constant.

12. A differential gearing mechanism as claimed in claim 1, wherein the mechanism is adapted for converting rotary motion to linear motion, and comprising driving means for rotating one of said members about its axis.

13. A differential gearing mechanism as claimed in claim 1, wherein the mechanism is adapted for converting linear motion to rotary motion, the parts of the mechanism being so constructed and arranged that the application of a force which is directed axially of the lead screw to the differential roller rotates the lead screw.

References Cited

UNITED STATES PATENTS

| | | | |
|---|---|---|---|
| 3,295,385 | 1/1967 | Jenny. | |
| 3,343,426 | 9/1967 | Popper | 74—424.5 |
| 3,393,574 | 7/1968 | Roantree | 74—424.7 |

FOREIGN PATENTS

| | | |
|---|---|---|
| 1,326,402 | 4/1963 | France. |

LEONARD H. GERIN, Primary Examiner

U.S. Cl. X.R.

74—89